INVENTOR.
MUNRO K. HAYNES

BY John E Dougherty Jr

ATTORNEY

Nov. 29, 1960 M. K. HAYNES 2,962,215

MAGNETIC CORE CIRCUITS

Filed Dec. 23, 1957 5 Sheets-Sheet 2

Nov. 29, 1960 M. K. HAYNES 2,962,215

MAGNETIC CORE CIRCUITS

Filed Dec. 23, 1957 5 Sheets-Sheet 3

Nov. 29, 1960 M. K. HAYNES 2,962,215

MAGNETIC CORE CIRCUITS

Filed Dec. 23, 1957 5 Sheets-Sheet 4

2,962,215
Patented Nov. 29, 1960

2,962,215

MAGNETIC CORE CIRCUITS

Munro K. Haynes, Poughkeepsie, N.Y., assignor to International Business Machines Corporation, New York, N.Y., a corporation of New York Filed Dec. 23, 1957, Ser. No. 704,709
18 Claims. (Cl. 235—175)

The present invention relates to arithmetic and logical circuitry and systems and, more particularly, to circuitry and systems of this type which employ multipath magnetic cores as logical switching elements.

The initial use of cores of magnetic material with essentially square hysteresis loop characteristics in computers was confined almost exclusively to storage and some auxiliary logical applications wherein the cores were operated as essentially single path structures. However, as the art progressed, it was realized that a single structure of magnetic material actually comprised a plurality of magnetic flux paths which, by properly arranging input and output windings, could be utilized individually and collectively to accomplish a greater number of logical and/or other switching functions than was possible when only a single flux path within the core structure was employed. Structures of this improved type have come to be termed multipath cores and examples of their use which demonstrate their versatility may be found in copending applications Serial No. 608,227 and Serial No. 703,583 filed, respectively, on September 6, 1956, and July 13, 1958, and assigned to the assignee of this application.

A prime object of the invention is to provide improved arithmetic and logical systems and multipath magnetic core circuitry usable in such systems.

This object and other objects set forth below are achieved, as is illustrated by the embodiments of the invention herein disclosed by way of example, by utilizing as a basic switching and logical element a multipath core structure operated in accordance with the principles described in detail in the above-mentioned copending application Serial No. 703,583. This core, which may be considered to include two parallel flux paths of unequal length, is provided with at least two input windings. The first one of the input windings embraces the entire cross section of the core and thus both the parallel flux paths and the second input winding is threaded through an opening in the core to embrace only the portion of the cross section of the core material at a point adjacent the opening which comprises one of the two parallel flux paths. The core is initially reset to a remanent condition with flux oriented in the same direction in both of the parallel paths. Thereafter, exclusive energization of either of the first and second input windings with a half select pulse of predetermined magnitude is ineffective to produce flux reversal in the magnetic material of the core. However, when half select pulses are coincidentaly applied to both input windings, flux reversal is accomplished which results in a localized closed flux path being established in the core material surrounding the opening through which the second input winding is threaded. The establishing of this localized flux path causes the flux in the remaining portion of the core to "kidney"; that is, the flux in the inner and shorter path is reversed and forms with the unreversed flux in the outer or longer path a continuous crescent or kidney shaped flux pattern. The core is also provided with a number of output openings through each of which is threaded at least one drive or input winding and two or more output windings. The application of a pulse to any one of these input windings with the core structure in the reset condition, that is, with flux in both paths oriented in the same direction, is ineffective to produce flux reversal. However, when the core is initially conditioned to produce outputs by an initial coincident energization of the first and second input windings, a subsequent energization of any one of the drive or input windings threaded through one of the output openings produces a flux reversal in the core material around that opening thereby inducing outputs on the output windings threaded through the opening. Outputs are produced only on output windings threaded through the particular output opening through which the pulsed input or drive line is threaded. Therefore, the developing of an output on any one of the output windings associated with the core indicates that pulses have been initially applied coincidently to the first and second input windings and subsequently to the particular drive winding threaded through the output opening through which the output winding is also threaded.

A parallel binary adder is constructed in accordance with the principles of the invention utilizing core structures of this type. The adder requires four such core structures per stage. The cores in each stage are arranged in matrix like fashion and inputs representative of either one or zero values for one variable are applied to corresponding horizontally arrange drive lines and for the other variable to vertically arranged column drive lines. The row and column lines drive are respectively coupled to the first and second input windings on the associated cores and, for each one of the four possible combinations of zero and one values for the two variable inputs, one and one only of the four cores is subjected to coincidently applied magnetomotive forces effective to produce flux reversal therein and thereby condition that core to produce outputs on its output windings in response to the energization of one or the other of the drive windings threaded through the core output openings. There are two such output openings and one drive winding associated with each; one drive winding is coupled to a first carry output line of the preceding stage on which an output pulse is developed for a carry of one from that stage and the other is coupled to a second carry output line of the preceding stage on which an output pulse is developed for a carry of zero. The transmission of these carry pulses and the production of sum outputs for each stage is initiated by applying a pulse to the carry zero input line for the lowest order stage of the adder. This input line is connected to one of the drive windings for each of the cores in that stage and produces flux reversal only around a particular output opening in the core which was conditioned to produce outputs by the particular combination of inputs applied. The two output windings associated with each of the output openings, zero or one, are coupled to sum and output terminals for the stage to produce the sum and carry outputs required by the rules of binary addition for the single one of the eight possible combinations of variable and carry inputs which produce flux changes around that opening. Sum output pulses and carry output pulses for each stage are thus produced with the carry output pulses being transmitted as carry one or carry zero inputs to the next succeeding stage to produce the proper carry and sum outputs for that stage.

In accordance with another embodiment of the invention a multistage decimal adder of the same type is provided. Since the decimal notation requires ten values for each of the two input variables, one hundred core structures are required to represent all of the possible combinations of inputs. As before, each core structure has two output openings with two associated output windings for producing sum and carry outputs in accordance with the rules of decimal addition in response to carry one or carry zero pulses from the preceding stage. A further embodiment is illustrated which also utilizes one hundred cores per stage and receives decimal inputs but which produces outputs in a binary decimal notation. This is accomplished by providing each of the output openings for each core structure with the number of output windings necessary to produce a carry output of one or zero and also the proper sum output expressed in a binary decimal notation.

In accordance with a further embodiment of the invention, which serves to illustrate that the number of output openings and therefore the number of independent variables which can be applied to produce outputs is limited only by the size of the core structure, a multistage arithmetic unit is provided which is effective to produce simultaneously or individually both the sum and difference of two multi-order binary inputs. This is accomplished utilizing four core structures per stage with each core structure being provided with four output openings, two of which, as above, being associated with carry zero and carry one lines from the preceding stage and the other two being associated with borrow one and borrow zero lines from the preceding stage. The borrow lines perform a function similar to that of the carry lines in that they transmit the proper borrow of either one or zero from stage to stage and also cause each stage to produce difference and borrow outputs in accordance with the rules of binary subtraction.

Thus, an object of the invention is to provide improved parallel entry multistage arithmetic circuitry.

A more specific object is to provide improved parallel entry binary and decimal adder and subtractor circuits employing multipath magnetic core structures.

A further object is to provide systems for performing arithmetic operations on first and second variable inputs wherein each stage of the system comprises a plurality of switching or gating elements, in number equal to the number of possible combinations of values for first and second input factors, and each element, when conditioned by the proper combination of first and second inputs, is capable of producing, in response to any one of a plurality of value signals from a preceding stage, outputs indicative of the combination of the values of the two variable inputs with the value represented by the signal from the preceding stage.

A further object is to provide improved magnetic core logical circuits.

Still another object is to provide an arithmetic unit capable of receiving a number of input arithmetic factors in one numeric notation and producing outputs indicative of arithmetic combinations of these factors in a different numeric notation.

A feature of the invention lies in the provision of a multistage arithmetic unit capable of individually or simultaneously producing outputs indicative of different arithmetic combinations of a plurality of applied input factors.

A further object of the invention is to provide a circuit for performing arithmetic operations on first, second and third single order factors, entered in the form of signals representative of the values of the factors in a particular arithmetic notation, wherein the logical switching necessary to produce first and second order output signals representative of arithmetic combinations of the three input factors is accomplished by a coordinate array of switching or gating elements in which the number of elements in each row and in each column is equal to the number of possible values in a single order of the said particular arithmetic notation.

A further object of the invention is to provide a multistage arithmetic unit capable of simultaneously producing both sum and difference outputs for two arithmetic factors wherein the same magnetic core structures are employed as switching elements in producing both outputs.

Other objects of the invention will be pointed out in the following description and claims and illustrated in the accompanying drawings, which disclose, by way of example, the principle of the invention and the best mode, which has been contemplated, of applying the principle.

Figure 1:
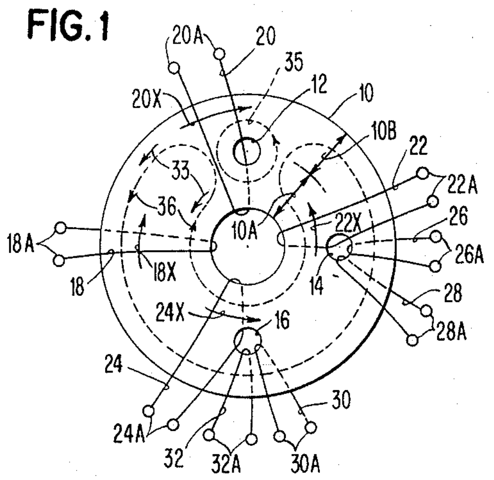
Fig. 1 is a schematic representation of one embodiment of a multipath core switching element with the input and output windings necessary for utilization in the novel circuitry of the present invention.
Figure 2:
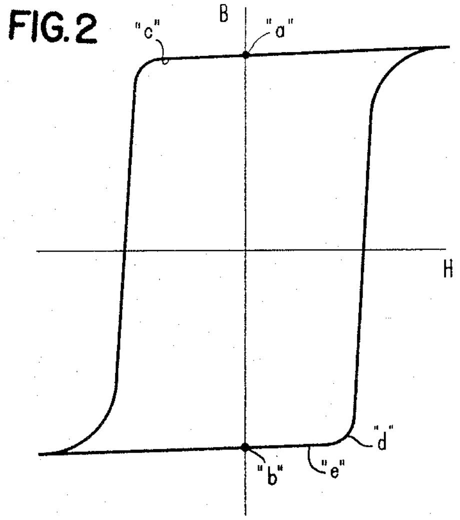
Fig. 2 is a plot of flux density B versus magnetic field intensity H for a magnetic material such as might be employed in the core shown in Fig. 1.

Referring now to Fig. 1, there is shown a core 10 of magnetic material having three openings, 12, 14, and 16, pierced therethrough dividing the core into two parallel flux paths 10A and 10B of essentially equal cross sectional area. The inner path 10A is shorter than the outer path 10B. The core itself is made of a magnetic material which exhibits an essentially square hysteresis loop such as is shown in Fig. 2. The core material exhibits two limiting remanent states of magnetization in opposite directions, which states are represented at "*a*" and "*b*" in Fig. 2. The core material also exhibits a precisely defined threshold, that is the loop has essentially square knees as is indicated at "*c*" and "*d*" in Fig. 2. With core material of this type, it is necessary to apply magnetic fields in excess of the threshold field to initiate flux reversal from one direction to the other. When fields less than the threshold field are applied, the core material undergoes a reversible flux change, as indicated, for example, by a traversal of the segment "*be*" in Fig. 2 and upon termination of the applied field returns to the original remanent condition at "*b*."

The core 10 in Fig. 1 is provided with four input windings designated 18, 20, 22, and 24 and four output windings designated 26, 28, 30, and 32. The core is originally reset to a first condition of remanence with flux in both of the paths 10A and 10B oriented in a counterclockwise direction as indicated by the arrows 33. With the core in this condition, inputs may be applied at terminals 18A and 20A to thereby energize the associated input windings 18 and 20 to render them effective to apply to the embraced core material magnetomotive forces in a clockwise direction, as is indicated by the arrows 18X and 20X associated with these windings. The magnitude of the magnetomotive forces applied by each of these windings individually is such that neither is effective when energized alone to produce a flux reversal from one remnant state to the other in any of the core paths. Thus, when either winding 18 or 20 is energized exclusively, the core 10 will, upon termination of the energizing signal, reassume a condition of unidirectional flux remanence in the direction indicated by arrows 33. Winding 18 embraces the entire cross section of core 10 and winding 20 is threaded through opening 12 to embrace only the inner flux path 10A. When both of these windings are energized coincidently, the magnetomotive forces applied thereby are effective to cause flux reversal to be accomplished in a localized flux path around the opening 12 as is indicated by the flux line 35. The establishing of this closed localized path around opening 12 causes the flux in the remaining portion of the core to "kidney" as is indicated by the arrows on the lines designated 36. The establishing of the localized path around the opening and the "kidney" or crescent shaped flux pattern thereby resulting in the remaining portion of the core is similar to the flux pattern described in detail in copending application Serial No. 608,227, filed September 6, 1956, in behalf of E. W. Bauer and assigned to the assignee of this application.

When, subsequent to the coincident energization of windings 18 and 20, either or both of the other input windings 22 and 24 are energized, the magnetomotvie forces supplied by these windings, each of which links only the inner flux path 10A, are in a direction to reverse the flux in this path and thereby cause localized paths of flux remanence to be established around openings 14 and 16. The establishing of these localized paths involves a flux reversal in both of the paths 10A and 10B at points adjacent openings 16 and/or 14 according to which of the windings 22 and/or 24 are energized. The output windings 26 and 28 are threaded through opening 14 to embrace path 10B at a point adjacent opening 14 and thus these windings produce outputs when input winding 22 is energized subsequent to coincident energization of windings 18 and 20. Output windings 30 and 32 are threaded through opening 16 to embrace path 10B at a point adjacent this opening and thus have outputs induced thereon when input winding 24 is energized subsequent to a coincident energization of windings 18 and 20. The portions of the core adjacent the output openings, therefore, can be caused to successively assume any one of three different conditions of flux remanence; in the first or reset condition the flux in both the parallel paths is oriented in the counterclockwise direction; in the record or "kidney" condition the flux in the inner path 10A is oriented in a clockwise direction and, in the outer path 10B, the flux is oriented in a counterclockwise direction; and in the third condition the flux in path 10A is oriented clockwise and in path 10B counterclockwise. If neither of the windings 18 or 20 is energized, or only one is energized at a time, the subsequent energization of windings 22 and 24 will not produce any outputs on the output windings since the magnetomotive forces supplied by these input windings is in the same direction as the remanent flux in path 10A. It should be here noted that the threshold force necessary to accomplish flux reversal around the openings in the core differs in accordance with the remanent state of flux in the core. Thus, for example, the force necessary to cause switching around opening 12 with all the flux in the core oriented clockwise is greater than the force necessary to subsequently switch the flux around this opening or opening 14 after the "kidney" condition has been established. This difference in threshold force is due to the fact that in the former case it is necessary to switch not only the flux adjacent the opening but also the flux in the inner path throughout the entire core.

Figure 3:
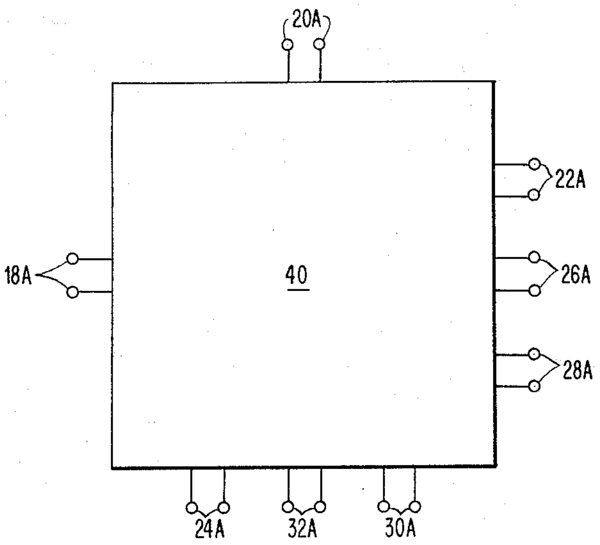
Fig. 3 is a symbolic box type representation of the core structure of Fig. 1.

Each of the windings associated with core 10 are shown in Fig. 1 to be connected to a pair of terminals which have the same designation as the windings with the letter "A" affixed. The core structure and windings are represented in box form in Fig. 3, the numeral 40 being utilized to designate the box and the input and output connections to the windings are represented by terminals having designations corresponding to the terminals shown connected to the windings in Fig. 1.

Figure 4:
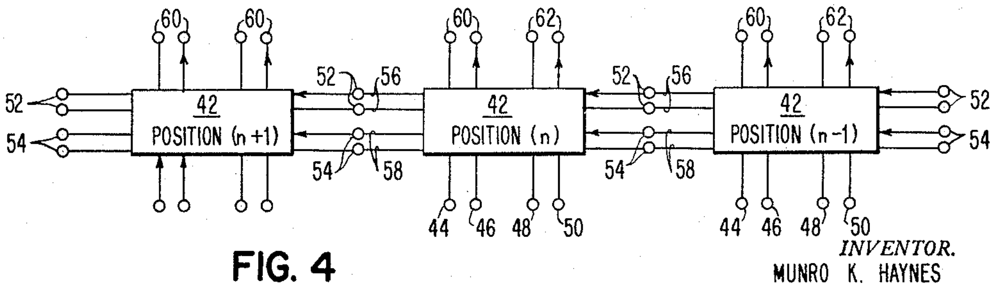
Fig. 4 is a schematic representation, in box diagram form, of a multistage binary adder.

Fig. 4 shows in box diagram form a section of a multistage binary arithmetic circuit which may be constructed utilizing, as a switching element, the core structure shown in Fig. 1. Each of the boxes 42 shown in Fig. 4 represents a binary full adder; that is a circuit capable of producing first and second order outputs, usually termed sum and carry outputs, indicative of the binary addition of three binary input factors. Signals representative of values for two independent input factors are applied to each of the binary adders at terminals designated 44, 46, 48, and 50. The terminals 44 and 46 receive pulses representative of what may be termed the *"y"* input factor and the terminals 48 and 50 receive pulses representative of what may be the *"x"* input factor to the associated adder. When a *"y"* input of one is to be applied, a pulse is supplied at terminal 44, and when a *"y"* input of zero is to be applied, a pulse is supplied at terminal 46. Similarly, the application of an *"x"* input of one is accomplished by applying a pulse at terminal 50 and the application of an *"x"* input of zero is accomplished by applying a pulse at terminal 48. The third input factor to each of the binary adders is applied at terminals 52 and 54. These terminals for each successive position of the multistage adder are connected to the lines 56 and 58 on which the carry outputs for the preceding stage is developed. When the *"x," "y,"* and carry inputs applied to any stage are such that, in accordance with the rules of binary addition, a carry to the next succeeding stage is required, a pulse is developed on line 56. When no carry, or stated differently a carry of zero, is required a pulse is developed on line 58.

Figure 5:
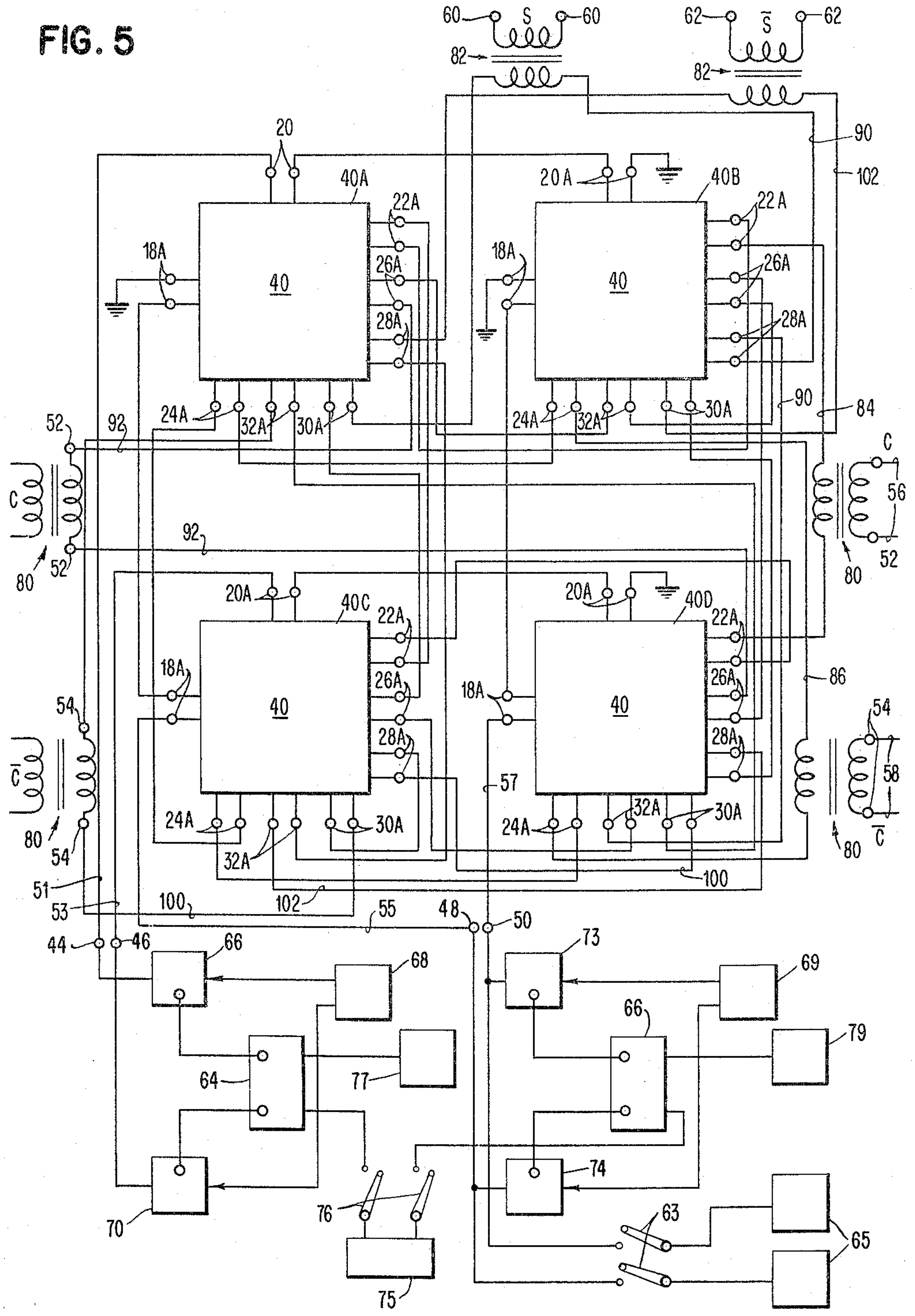
Fig. 5 is a diagrammatic representation of a single stage of the adder of Fig. 4 constructed in accordance with the principles of the invention.

The mode of operating the arithmetic circuit of Fig. 5, utilizing core structures of the type shown in Fig. 1, requires that the *"x"* and *"y"* inputs to each stage be first applied. These inputs are effective in a manner, about to be described in detail, to cause one of the magnetic cores in the associated stage to assume a condition representative of the *"x"* and *"y"* inputs applied. Subsequently, a pulse is applied to the terminals 54 connected to the zero carry input lines for the lowest order stage of the adder. This pulse causes to be produced at terminals 60 or 62 for this position a pulse indicative of the sum of the inputs applied thereto; a pulse being produced at terminals 60 when the *"x," "y"* and carry inputs are such that a sum output of one is required and a pulse is produced at terminals 62 when a sum output of zero is required. The application of the pulse to carry input terminals 54 also causes a pulse to be produced on either of the output lines 56 or 58 in accordance with whether or not the inputs to that stage require a carry of one or zero to be applied to the next stage. This pulse, whether applied at terminals 52 or 54, has an effect similar to the pulse originally applied to the carry input terminals 54 for the lowest order stage in that it causes to be produced at either terminals 60 or 62 a pulse representative of the sum output for the *"x," "y"* and carry inputs applied to this stage and similarly a pulse to be devloped on either lines 56 or 58 representative of the proper carry output for the input applied. This operation is repeated in each stage of the adder with the carry inputs applied to each successive stage causing proper sum and carry outputs for that stage to be produced.

A circuit for performing the full binary adder logical function required in each of the stages 42 of the circuit of Fig. 4 is shown in Fig. 5. This circuit includes four core structures of the type shown in Fig. 1, which are here represented by the boxes 40. The four core structures, which are designated 40A, 40B, 40C, and 40D, receive their *"y"* inputs from a pair of drive lines 51 and 53 respectively connected to terminals 44 and 46 which correspond to similarly designated terminals shown in Fig. 4. The *"x"* inputs are applied to the cores by a pair of drive lines 55 and 57 which are respectively connected to terminals 48 and 50 corresponding to the same terminals in Fig. 4. The drive line 55 which, being connected to terminal 48, receives a pulse each time an "$x$" input of zero is to be applied is connected to the input terminals 18A for core circuits 40A and 40C. These terminals are connected, as indicated in Fig. 1, to the windings 18 for these cores and the pulses applied to drive line 55 are sufficient to render these windings effective to apply half select signals to the associated cores. The drive line 55 is termed the $\bar{x}$ drive line, this symbol being representative of an "$x$" input of zero or conversely the absence of a one input. The drive line 57 is termed the $x$ drive line in that it receives a pulse each time the "$x$" input is a one and is coupled to the terminals 18A for the core circuit 40B and 40D. The drive line 44, which is termed the $y$ drive line, is coupled to the input terminals 20A for the core circuits 40A and 40B and the drive line 46, which is termed $\bar{y}$ drive line, is similarly coupled to terminals 20A of core circuits 40C and 40D. Each of the four cores in the circuit of Fig. 5 is initially reset to a condition of unidirectional flux remanence, as indicated by arrows 33 in Fig. 1, by operating a pair of switches 63 which are coupled to a pair of signal sources 65. When these switches are operated, the signal sources are coupled to drive lines 55 and 57 and apply to these lines signals effective to cause the associated windings 18 to reset the cores to this initial condition of flux remanence. Thereafter, switches 63 are opened and inputs are selectively applied to the proper ones of the $x$, $\bar{x}$, $y$, $\bar{y}$ drive lines. Inputs are applied to these drive lines under the control of a pair of triggers 64 and 66. One of the output terminals of trigger 64 is coupled to the control input of a gate 66 which gate controls the application of pulses from a clock pulse source 68 to the $y$ drive line 51. The other terminal of trigger 64 is coupled to the control terminal of a gate 70 which controls the application of signals from the source 68 to the $\bar{y}$ drive line 53. A similar pair of gates 73 and 74 are coupled to the terminals of trigger 66 to control the application of clock pulses from a source 69 to the $x$ and $\bar{x}$ drive lines 55 and 57. For details of trigger and gate circuits suitable for use in circuits of this type, reference may be made to copending application Serial No. 667,837 filed June 25, 1957, in behalf of M. K. Haynes and assigned to the assignee of this application. The triggers 64 and 66 are reset by a reset signal source 75 under control of a pair of switches 76 operated in conjunction with switches 63 to initially reset these triggers to control the associated gates so that the $\bar{y}$ gate 70 and $\bar{x}$ gate 74 are open to allow pulses supplied by the clock pulse sources 68 and 69 respectively to be applied to the $\bar{y}$ drive line 53 and the $\bar{x}$ drive line 55. When a binary one input is to be applied to either the $x$ or $y$ drive lines during a cycle of operation, the corresponding one or both of the triggers 64 and/or 66 are set to the other stable state prior to the application of the clock pulses applied by sources 68 and 69. These triggers are set under the control of a pair of signal sources 77 and 79 which are respectively controlled by circuitry not shown to apply signals to the appropriate triggers 64 and 66 when "$x$" and "$y$" inputs of one are to be applied to the adder position with which they are associated.

Thus, when the clock pulses are supplied by sources 68 and 69, one or the other of the gates 66 and 70 and one or the other of the gates 73 and 74 are open to allow the transmission of pulses therethrough to the associated drive lines. When zero inputs are to be applied to both drive lines ($\bar{x}$ $\bar{y}$), signals are coincidently applied to drive lines 53 and 55, thereby coincidentally energizing the windings 18 and 20 for core structure 40C. The coincident energization of these windings, in a manner previously explained with reference to Fig. 1, causes a localized flux path to be established around opening 20 and the flux in the remaining portion of the core to be kidneyed. An examination of the circuit connections shows that core structure 40C is the only one of the four core structures which is connected to both the $\bar{x}$ drive line 55 and the $\bar{y}$ line 53. Thus, flux reversal is accomplished only in core circuit 40C when "$x$" and "$y$" inputs of zero are applied and the other core circuits 40A, 40B, and 40D remain in their original condition with flux oriented in a clockwise direction in both of the paths 10A and 10B.

In a similar manner, when "$x$" and "$y$" inputs of one ($x$ $y$) are applied, flux reversal is accomplished only in core 40B and the crescent shaped flux pattern with the flux in the inner path 10A reversed is established only in this core structure. When an "$x$" input of one and a "$y$" input of zero are applied ($x$ $\bar{y}$), core circuit 40D undergoes a flux reversal and the other three cores remain in their initial condition. Similarly, when an "$x$" input of zero and a "$y$" input of one ($x$ $\bar{y}$) are applied, flux reversal is accomplished only in core circuit 40A and the remaining three cores stay in their initial condition.

Thus, each one of the core circuits 40A, 40B, 40C, and 40D is caused to undergo a flux reversal whereby the flux in the inner paths 10A adjacent openings 14 and 16 is oriented in a clockwise direction for a corresponding one of the four possible combinations of "$x$" and "$y$" inputs. After the "$x$" and "$y$" inputs are applied to each stage of the adder shown in Fig. 4, which application may be accomplished either serially or in parallel, a pulse is applied at the terminals 54 for the lowest order stage of the adder. As before explained, this pulse produces proper outputs at the sum terminals 60 and 62 for each stage of the accumulator and causes a pulse indicative of either the presence or absence of a carry to be applied by each stage to the proper one of the carry inputs 52 or 54 for the next succeeding stage.

In the showing of Fig. 5 the carry outputs of each stage are coupled to the carry inputs of the next succeeding stage by transformers 80. Similarly, the sum outputs are taken by way of transformers 82. After the "$x$" and "$y$" inputs have been applied and one of the four core circuits 40A, 40B, 40C, or 40D undergoes a flux change as described above, a pulse is applied to one of the input transformers 80 for each stage in accordance with whether the combination of "$x$," "$y$" and carry inputs to the preceding stage produce a carry of one or zero. As shown in Fig. 5, the pulse applied to the stage there illustrated in detail when the preceding stage produces a carry of one and, therefore, a pulse at terminals 52, is applied by a drive line 84 to the terminals 22A for each of the four core structures in this stage. Terminals 22A, as is indicated in Fig. 1, are coupled to input winding 22 which is threaded through opening 14 to embrace the inner flux path 10A. When the preceding stage does not produce a carry, a pulse is transmitted through the input transmitter 80 coupled to terminals 54 to a drive line 86 which is coupled to the input terminals 24A for each of the four core circuits. These terminals, as is indicated in Fig. 1, are connected to the windings 24 for the four cores and are threaded through openings 16 to embrace only the inner flux paths 10A. The magnetomotive forces applied when a winding 22 or 24 on any of the four cores is energized is in the direction indicated by the arrows 22X and 24X shown respectively associated with these windings. These magnetomotive forces, being in a counterclockwise direction, will not affect any flux reversal in an associated core when the direction of flux orientation in that core was undisturbed by the previous application of the "$x$" and "$y$" inputs and, therefore, the flux path 10A remains oriented in the counterclockwise direction. However, when the combination of "$x$" and "$y$" inputs is effective to reverse the direction of flux orientation in path 10A in the manner previously described, the magnetomotive forces applied by windings 22 and 24, when energized, cause flux reversal around a localized path surrounding openings 14 and 16, respectively. As a result of such a flux reversal around one or the other of these openings, outputs are produced on either output windings 26 and 28, or 30 and 32 in accordance with whether winding 22 or 24 is energized.

For each of the four possible combinations of "x" inputs applied to each stage, one and only one of the core circuits 40A, 40B, 40C, 40D undergoes a flux reversal in path 10A to condition that core to produce sum and carry outputs upon the subsequent application of an input signal to either winding 22 or 24. For example, when the "x" input applied is a one and the "y" input applied is a one (xy), only core circuit 40B undergoes the flux reversal necessary to condition it to produce the necessary sum and carry outputs when either the winding 22 or 24 associated with the core of this circuit is energized in response to the presence or absence of a carry from the preceding stage. Where there has been a carry one pulse produced in the preceding stage, winding 22A is energized thereby causing outputs to be produced on output windings 26 and 28 which windings are coupled, respectively, to output terminals 26A and 28A. With "x," "y" and carry inputs of one to the binary adder of Fig. 4, it is necessary, in accordance with the rules of binary addition, that both a sum and carry output be produced. The sum output is produced at terminals 28A, which terminals are coupled by a sum output line 90 to the input coil of the transformer 82 whose output coil is coupled to terminals 60. The carry output is produced on terminals 26A which terminals are coupled by an output line 92 to the terminals 52 which are coupled to the carry one input transformer 80 for the next stage.

When zero inputs are applied to both the x and y drive windings only the core associated with core circuit 40C undergoes a flux reversal in path 10A. When, after such an input, a carry input of zero is applied from the preceding stage to the input winding 86, flux reversal is produced in the core associated with circuit 40C in a path surrounding opening 16. As a result, outputs are produced at output terminals 30A and 32A for this stage which outputs are respectively transmitted by output lines 100 and 102 to the zero carry output terminals 54 and through the transformer 82 to the zero sum output terminals 62 for this stage. The production of a pulse of these terminals is indicative of a binary addition producing neither a sum nor a carry output which is, of course, proper for the additive combination of "x," "y" and carry inputs of zero.

There are sixteen output terminals, four associated with each of the core circuits 40 of Fig. 4. Eight of these output terminals are utilized to produce outputs at terminals 60 and 62 in response to the eight possible combinations of "x," "y" carry inputs to the circuit. The remaining eight output terminals associated with the four cores perform a similar function in producing the desired output at carry output terminals 52 and 54. The core circuit output terminals which produce these outputs for the eight possible combinations of inputs are illustrated in the table below.

| Inputs | | | Outputs Required | | Core Circuit and Terminals at which Outputs Produced | | |
|---|---|---|---|---|---|---|---|
| x | y | Carry | Sum | Carry | Core Circuit | Sum | Carry |
| 1 | 1 | 1 | 1 | 1 | 40B | 28A | 26A |
| 1 | 1 | 0 | 0 | 1 | 40B | 30A | 32A |
| 0 | 1 | 1 | 0 | 1 | 40A | 28A | 26A |
| 0 | 1 | 0 | 1 | 0 | 40A | 30A | 32A |
| 1 | 0 | 1 | 0 | 1 | 40D | 28A | 26A |
| 1 | 0 | 0 | 1 | 0 | 40D | 32A | 30A |
| 0 | 0 | 1 | 1 | 0 | 40C | 26A | 28A |
| 0 | 0 | 0 | 0 | 0 | 40C | 32A | 30A |

From the above, it is apparent that each of the core circuits 40 of Fig. 5 produces two outputs indicative of two different logical combinations of inputs. Further, the circuit operation may, from a logical standpoint be termed noncommutative as to time for, considering the three variable inputs "x," "y" and carry, outputs are produced only if the "x" and "y" inputs are first coincidently applied and then the carry input is applied. If the pulse application is in any other sequence, no outputs are produced. For example, if the "x" and "y" inputs are not applied coincidently, each core circuit is subjected to at least one-half select signal and one core to two successive half select signals. Under such conditions, none of the cores will undergo a flux reversal and no outputs are produced when the carry inputs are subsequently applied. If the carry input is applied coincidently with the "x" and/or "y" inputs, no flux reversal is accomplished and no outputs produced since the magnetomotive force applied by the carry input windings is in an opposite direction to that applied by the "x" and "y" input windings.

Further note should be made of the fact that by utilization of the magnetic multipath switching element as shown in the binary full adder operated in the manner described above, there is no possibility of producing sum outputs for any position which does not reflect the proper carry from the preceding position since it is the carry pulse from the preceding position, whether representative of a carry of one or zero, which produces the sum and carry outputs for the next stage. Such an arrangement is made possible by coupling the individual stages with lines for transmitting pulses representative of carries of both one and zero from the preceding stage. Therefore, the pulse applied to the terminals 54 for the lowest order stage of the adder may be considered as a read out pulse which not only produces the sum output pulse for this stage but causes to be propagated from stage to stage carry one and carry zero pulses. These carry pulses both enter the proper carry information into each successive stage and also cause to be read therefrom sum outputs which reflect the sum of the two independent inputs applied and this carry information.

Since the outputs produced at the various output terminals 26A and 28A, and 30A and 32A for each core circuit 40 are dependent only upon the "x," "y," and carry inputs applied to that stage, the output terminals need not be connected together in the manner shown but may be individual outputs connected to separate utilization circuits. With this type of connection, the circuit may be considered as a universal logical circuit capable of producing positive outputs indicative of the eight possible combinations of three input variables each having two possible values wherein two of the inputs ("x" and "y") must be entered simultaneously before the entry of the third input.

Figure 6:
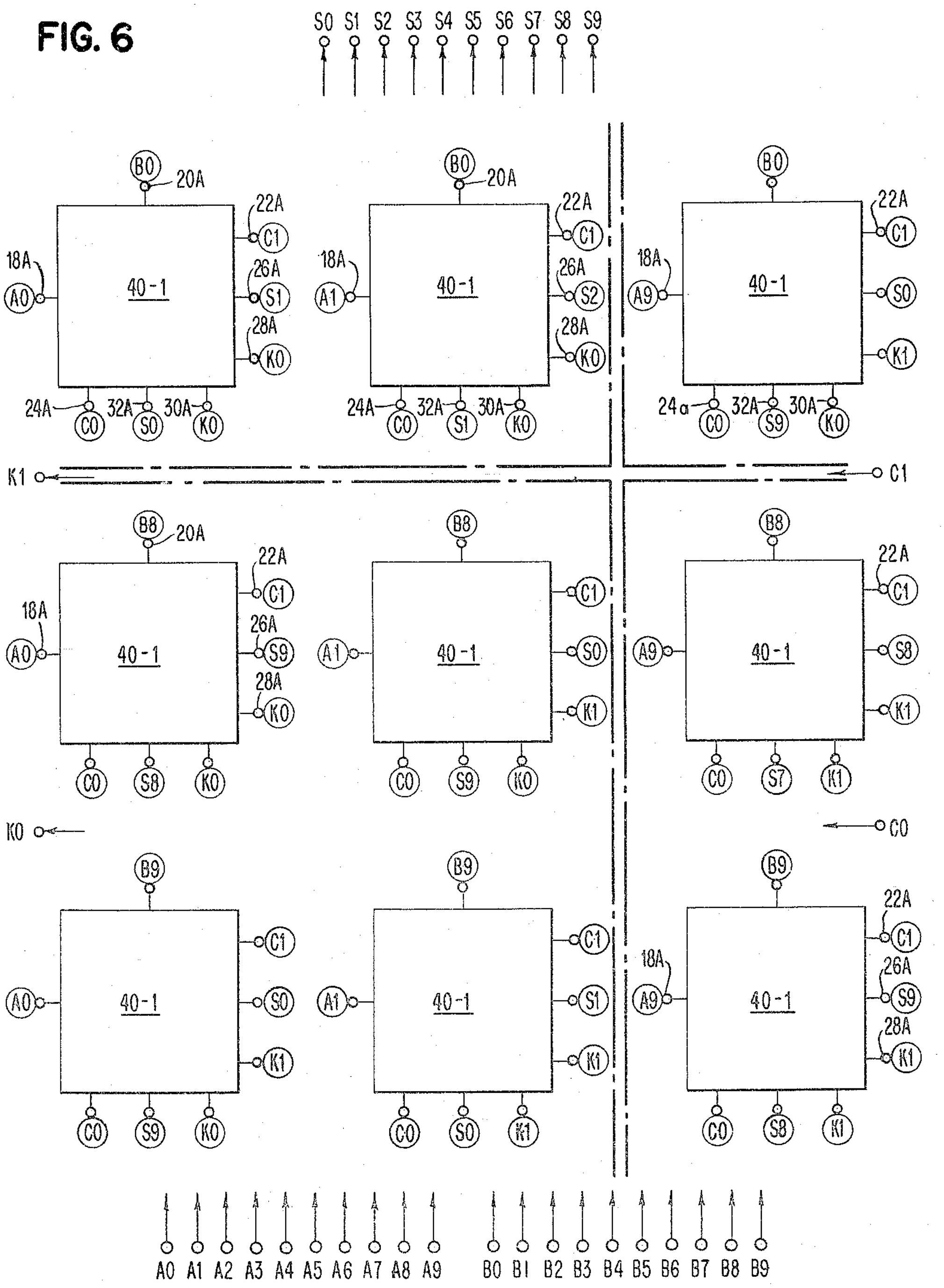
Fig. 6 shows a portion of a single stage of a decimal adder constructed in accordance with the principles of the invention.

The inventive principles may be also applied in constructing arithmetic circuits capable of handling values expressed in other numeric notations. For example, there is shown in Fig. 6 a portion of one stage of such a circuit usable in handling decimal digits. The mode of operation of the circuit is the same as that employed with a binary adder of Fig. 5, that is, first and second independent decimal inputs are first coincidently applied to each stage to condition a particular one of the core circuits therein in accordance with the values applied and, thereafter, pulses indicative of carries of either one or zero are transmitted from stage to stage with each such pulse producing first and second order or carry and sum outputs for the stage to which it is applied. The individual core structures are represented in Fig. 6 by boxes designated 40–1. The core structures represented by these boxes are of the type shown in Fig. 1. The box 40–1 is the same as that shown in Fig. 3 and designated 40 with the exception that only one terminal is shown for each input and output winding.

The reason for this change in the representation is to reduce the complexity of the drawings.

Each stage of the decimal adder constructed in accordance with the principles of the invention includes one hundred of the core structures shown in Fig. 1 which are arranged in a coordinate array consisting of ten vertical columns and ten horizontal rows. The inputs to the stage shown are supplied at terminals designated A0 and B0 through B9. Each of the A inputs is connected to the input terminals 18A for each of the ten core circuits in a corresponding row of the array. For example, the terminal A0 is coupled to each of the terminals 18A for the core circuits in the extreme left hand column for the stage shown. This is indicated by the designation A0 shown encircled adjacent each of the terminals 18A for the three core circuits illustratively shown in Fig. 6 in the first vertical column. This type of designation, that is, with the input or output terminal with which each of the core circuit input and output winding terminals is associated being shown encircled adjacent the winding terminal, is utilized to avoid the complexity which would result if all of the individual connections for all of the core circuits of each stage were shown. The connections are made in the same manner as is indicated in more detail in Fig. 5, with the windings of the core circuits being series connected to the particular one of the input or output terminals with which they are associated. Thus, each of the windings 18 (see Fig. 1) associated with the cores in the first vertical column of the stage shown are series connected to the A input terminal designated A0 to which a pulse is applied when a decimal input of zero is to be applied to this particular stage. The value signals representative of the second independent input factor are applied to the terminals B0 to B9, each of which is connected to the input terminals 20A for a corresponding horizontal row of the array of core structures. With this type of arrangement, it is readily apparent that, for every combination of A and B decimal inputs, one and one only of the core circuits is subjected to magnetomotive forces coincidently applied by both its associated input windings 18 and 20. For example, for an A input of 9 and a B input of 9, input pulses are coincidently applied at terminals A9 and B9 thereby coincidently energizing the windings 18 and 20 (Fig. 1) associated with the core circuit shown in the lower right hand corner of Fig. 6. Thus, the coincident application of any combination of two value pulses, representative of A and B decimal inputs, is effective to cause a particular one and one only of the core circuits to assume the "kidney" flux condition illustrated in Fig. 1 by the arrows 36.

After the A and B inputs have been thus applied, a pulse is applied to a terminal C0 associated with the lowest order stage of the decimal adder. The mode of operation is similar to that of the circuit of Figs. 4 and 5. The terminal C0, which may be designated the carry zero terminal, is series connected to each of the terminals 24A and, thus to each of the input windings 24 for each of the core circuits in the stage. This pulse, in a manner previously descrdibed, causes a flux reversal in a localized path around the opening 16 in the core circuit in which the "kidney" condition was established by the application of the A and B inputs. As a result, output pulses are developed on the output windings 30 and 32 associated with that core circuit. The first order outputs of the stage shown in Fig. 6 are taken at ten sum terminals, S0 through S9, on which are manifested outputs indicative of the decimal sum of the A and B inputs. The second order or carry inputs are developed at the carry output terminals designated K0 and K1. Each of the core circuit output winding terminals 30A, 32A, 26A, and 28A are associated with a particular one of the sum or carry output terminals and the particular terminal with which each is associated is indicated by the encircled designation adjacent that terminal. For example, again considering the core circuit shown in the lower right hand corner of Fig. 6, which circuit is conditioned to produce outputs when A and B inputs of nine are coincidently applied, the output winding terminal 32A is connected to the sum output terminal S8 and the output winding terminal 30A is connected to the carry output terminal K1. This is, of course, proper since decimal addition of the decimal values of nine and nine requires a sum output of the decimal value 8 and also the transmission of a carry of one to the next succeeding order. When, however, there is a carry input of one to the stage under consideration, a pulse is applied at the input terminal C1. The input terminal C1 is coupled to the input winding terminals 22A for each of the core circuits 40–1 in the associated stage. Therefore, the application of such a pulse, after one of the core circuits has been conditioned to produce outputs by the particular combination of A and B inputs applied, produces a flux reversal around the opening 14 (see Fig. 1) for that core circuit thereby producing outputs at terminals 26A and 28A. Again considering the lower right hand stage, it can be seen that the terminal 26A thereof is coupled to the sum output terminal S9 and the terminal 28A is coupled to the carry output terminal K1. This is of course correct since the proper output for A and B inputs of nine and a carry input of one are a first order or sum output of nine and a second order or carry output of one. The operation is similar regardless of which of the terminals A0 through A9 and B0 through B9 receive pulses representative of particular decimal inputs, sum and carry outputs being developed on the terminals 32A and 30A for the core circuit corresponding to the inputs applied when there is no carry from the preceding stage and the sum and carry outputs being developed on the output winding terminals 26A and 28A when there is a carry from the preceding stage.

Figure 7:
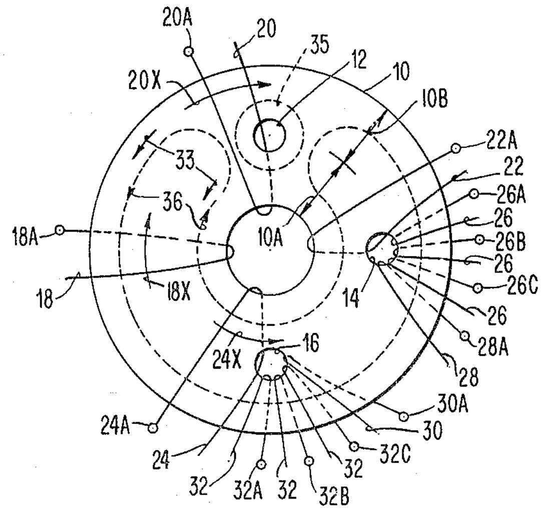
Fig. 7 shows a further embodiment of a magnetic core structure usable in the novel circuits of the present invention.
Figure 8:
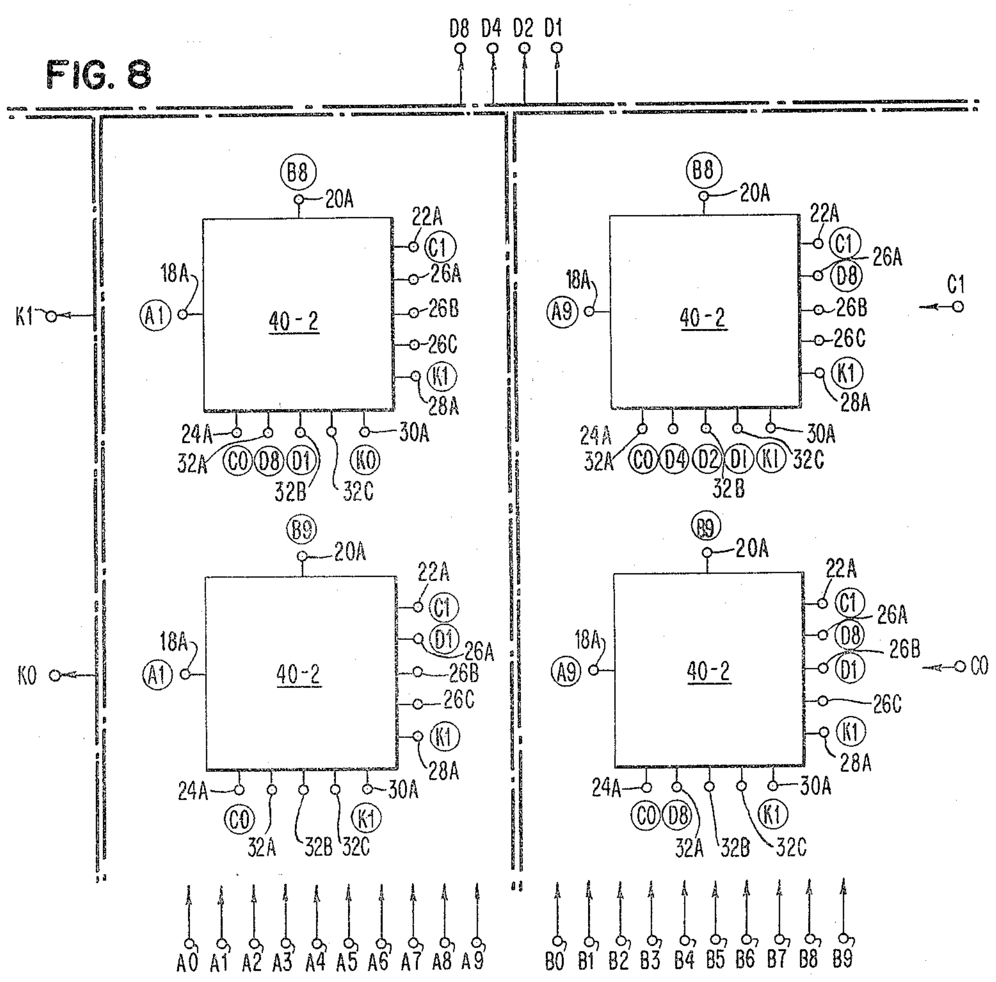
Fig. 8 shows, in box diagram form, a single stage of binary input, binary-decimal output, parallel adder.

The principles of the invention may be also applied in constructing arithmetic units of the type wherein the inputs applied are in one numeric system and the outputs are in a second numeric system; that is, wherein it is necessary that the arithmetic circuitry also perform the function of a decoder. A core structure usable in such a system is shown in Fig. 7. This structure is the same as that shown in Fig. 1 with the exception that two further output windings 26, which are threaded through opening 14, have been added and a further pair of output windings 32 threaded through opening 16 have also been added. The operation of the core circuit is the same as has been previously explained, the only function performed by the additional output windings being that of providing two additional outputs in response to the energization of winding 22 and two additional outputs in response to the energization of winding 24. An embodiment of one stage of an arithmetic decoder utilizing such a core structure is shown in Fig. 8 wherein the core structures are represented by boxes designated 40–2. The input and output winding terminals are designated in the same manner as like terminals for the boxes designated 40–1 shown in Fig. 6 and the additional output winding terminals associated with opening 14 are designated 26B and 26C and those associated with opening 16 are designated 32B and 32C. The accumulator, for which a single stage is schematically shown in Fig. 8, is one to which decimal inputs are applied and outputs developed in the binary decimal system. In accordance with the binary decimal system, each single order of decimal information is represented by four orders of binary information. The binary decimal system differs from a pure binary system in that the binary orders are arranged in groups of four and carry is accomplished from one group to the other each time a total equal to a decimal value of nine is exceeded. The values in the four binary orders of a binary decimal group which correspond to the decimal values one through nine are shown in tabular form below with the lowest binary order being that designated D–1, the next higher binary orders D–2 and D–4, and the fourth binary order D–8.

| Decimal | Binary Decimal | | | |
|---|---|---|---|---|
| | D8 | D4 | D2 | D1 |
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |

The decimal inputs are applied to the stage shown in Fig. 8 at the terminals A0 through A9 and B0 through B9 in the same manner as the decimal inputs were applied in the embodiment of Fig. 6; a pulse being applied to a particular one of the A terminals and a particular one of the B terminals in accordance with the A and B decimal inputs to be applied to the associated stage. Also, as in the embodiment of Fig. 6, one hundred individual core circuits are required to represent all of the possible combinations of A and B inputs. The individual core circuits 40–2 are again arranged in matrix form with each of the A terminals being connected to the input terminals 18A for the core circuits 40–2 in a corresponding vertical column of the matrix and each of the input terminals B0 through B9 being connected to each of the input winding terminals 20A of the core circuits 40–2 in a corresponding horizontal row of the matrix. Only four of the circuits 40–2 are shown in Fig. 8 with the encircled designations adjacent the winding terminals 18A and 20A thereof indicating the A and B input terminals with which each is associated. Inputs are applied in the same manner as in the embodiment of Fig. 6 with one and one only of the core circuits 40–2 being set in a "kidney" flux condition for each possible combination of A and B inputs. Also, as in the above described embodiment, a pulse is applied to the carry zero input terminal C0 for the lowest order stage of the circuit after the A and B inputs are applied. This pulse, as indicated by the encircled designations, is applied to each of the input winding terminals 24A for the lowest order stage thereby producing output signals on the winding terminals 30A, 32A, 32B, and 32C associated with the particular core circuit 40–2 conditioned to produce outputs for the combination of A and B inputs applied. The terminal 30A is coupled to either the output carry terminal K1 or K0 in accordance with whether or not in the particular A and B inputs which are applied to the associated core circuit produce a carry in the decimal system. These terminals K1 and K0 are respectively coupled to the carry input terminals C1 and C0 for the next stage. The terminals 32A, 32B, and 32C are connected to the proper ones of the output terminals D8, D4, D2, and D1 on which pulses representative of the sum of the decimal A and B inputs in the binary decimal notation are produced. In this embodiment, the presence of a pulse at any one of the output terminals D1, D2, D4, and D8 is representative of a binary one output in the corresponding order and the absence of a pulse is representative of a binary zero output. Referring now to the above table, it can be seen that there are never more than three such output pulses required to represent any value of decimal information in the binary decimal system and three such pulses are required only to represent a decimal value of seven. It is for this reason that the core structure 40–2 is provided with three output terminals 26A, 26B, and 26C and also three output terminals 32A, 32B, and 32C for producing sum outputs when the associated input terminals 22A and 24A, respectively, are energized. It is of course obvious that three such terminals are not required in each of the positions. For example, referring to the core circuit 40–2 shown in the above left hand corner of Fig. 8, which core circuit is conditioned to produce outputs when an A input of one and a B input of eight are applied, no binary decimal outputs are required when a carry of one is transmitted from the preceding stage and a pulse is applied to the associated terminal 22A. The addition of the A decimal value of one, the B decimal value of eight, and the carry input of one requires only that a carry output be transmitted to the next succeeding stage which is accomplished, as indicated, by the connection from the winding terminal 28A to the carry output terminal K1. However, three such sum winding output terminals associated with both the carry one and carry zero inputs are shown for each core circuit for the sake of uniformity with each being connected to the proper ones of the sum output terminals D1, D2, D4, and D8 are required. For example, considering the core circuit 40–2 shown in the upper right hand corner of Fig. 8, the winding terminal 32A, 32B, and 32C are respectively connected to sum output terminals D4, D2, and D1. This is of course proper since the inputs to this circuit are an A input of nine and a B input of eight which inputs require a sum output of seven when no carry is transmitted from the preceding stage and a pulse is therefore applied to the associated winding terminal 24A. When a carry is transmitted from the preceding stage and, therefore, the carry signal is applied instead to winding terminal 22A, an output pulse is required to be transmitted only to the sum output terminal D8 which is accomplished by the connection between this terminal and the winding terminal 26A associated with this core structure.

Figure 9:
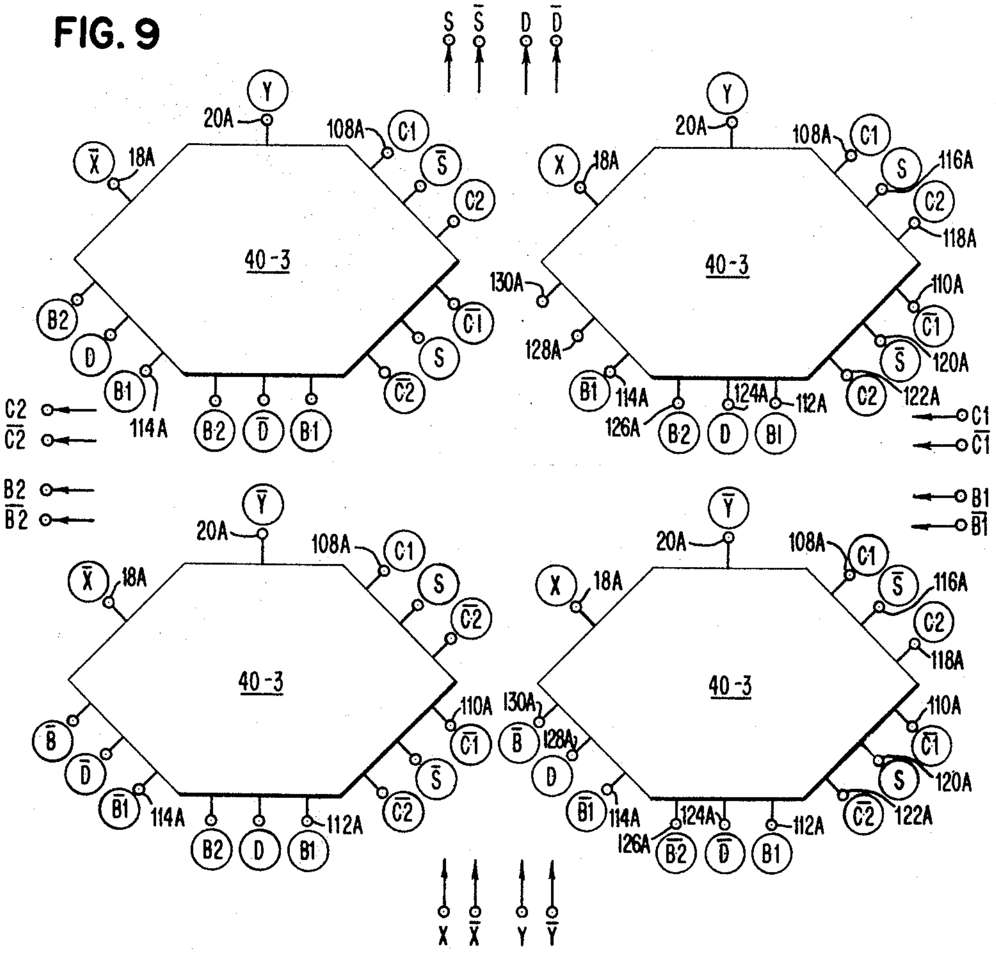
Fig. 9 shows, in box diagram form, a single stage of a binary arithmetic unit capable of performing both binary addition and subtraction.
Figure 10:
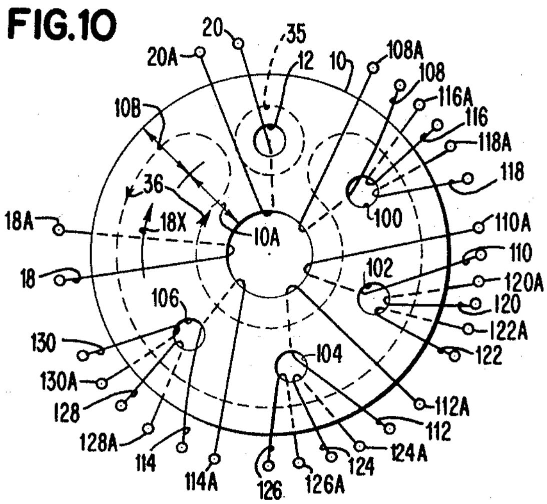
Fig. 10 is a schematic representation of a core structure usable in the circuit of Fig. 9.

In each of the embodiments thus far considered, the number of what may be termed logical inputs applied coincidently to any core circuit has been equal to the number of possible subsequent inputs which could be later applied to produce the desired logical outputs. Fig. 9 shows an embodiment of a binary arithmetic circuit illustrating that the number of possible subsequently applied inputs can be greater than the number of coincident inputs initially applied. The core structure utilized in the embodiment of Fig. 9 is shown in Fig. 10. This core is similar to that shown in Fig. 1 having an output winding 18 embracing the entire cross section of the core material and a further input winding 20 threaded through an opening 12 to embrace only the inner flux path 10A at a point adjacent that opening. The core structure shown in Fig. 10 differs from that of Fig. 1 in that four openings are provided instead of two about which localized flux changes can be caused to produce independent outputs. These openings are designated 100, 102, 104, and 106 and associated with each is one of four input windings 108, 110, 112, and 114 positioned to embrace the inner flux path 10A adjacent the opening. There are two output windings positioned through each of the openings to embrace only the outer flux path 10B at that point. These output windings are designated 116, 118, 120, 122, 124, 126, 128 and 130 and, as before, a terminal associated with each of the input and output windings is similarly designated with the addition of the letter "A." The operation is the same as that of the core structure of Fig. 1, that is, the coincident application of pulses to both of the input windings 18 and 20 is required to establish a "kidney" flux condition in the core and thereafter flux reversal in localized paths around the openings 100, 102, 104, and 106 may be selectively accomplished by energizing the proper one of the input windings 108, 110, 112 or 114. Outputs are produced only on the output windings threaded through the particular opening about which such a localized flux reversal is accomplished and, therefore, it is here possible to produce logical outputs indicative of the combination of the two inputs applied to windings 18 and 20 with any one of four possible subsequently applied inputs.

Figure 11:
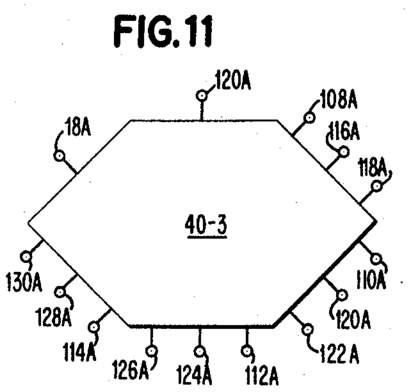
Fig. 11 is a symbolic box type representation of the core structure of Fig. 10.

The core structure of Fig. 10 is shown in box form and designated 40–3 in Fig. 11 with each of the terminals to which the various input and output windings are connected being represented as before with corresponding designations with the letter A added. Four such core structures are shown utilizing this schematic box representation in Fig. 9 which is an embodiment of one stage of an arithmetic circuit which is capable of performing either binary addition or subtraction. The inputs to the circuit are applied at terminals designated X, $\bar{X}$, Y, and $\bar{Y}$. A pulse is applied at the terminal X when it is desired to enter a binary one as an "X" binary input and a pulse is applied at the terminal $\bar{X}$ for an "X" input of zero. Similarly, inputs are applied at either the terminal $\bar{Y}$ or Y in accordance with whether the other variable input is to be a binary one or binary zero. The operation is similar to that of the embodiment of Fig. 5 in that one of the four core circuits 40–3 is conditioned to produce outputs for each possible one of the four combinations of the "X" and "Y" inputs. The same method as previously applied of indicating the particular input and output terminals for the arithmetic circuit to which the individual winding terminals are connected has been employed in Fig. 9. The operation of the circuit is the same as that of the embodiment of Fig. 5 when it is desired to produce outputs indicative of the binary sum of the "X" and "Y" inputs; that is, a pulse is applied to the terminal $\bar{C}_1$, which is the carry zero input terminal for the lowest order stage after the X and Y inputs have been applied. This terminal is connected to the winding terminals 110A for each of the four core circuits 40–3 and produces carry and sum outputs, respectively, on the terminals 122A and 120A associated with the core conditioned by the previous application of the "X" and "Y" inputs. The sum outputs are taken at a pair of terminals S and $\bar{S}$ which receive output pulses in accordance with whether or not a sum output of one or zero is required. The carry outputs are transmitted to carry output terminals designated $C_2$ and $\overline{C_2}$ from which they are applied to the proper input windings associated with the core circuits in the next succeeding stage. When a carry input of one is transmitted from the preceding stage, an input pulse is applied to each of the terminals 108A which are all coupled to the input terminal $C_1$ for that stage. In this case, the sum and carry outputs are respectively produced at winding terminals 116A and 118A in accordance with the rules of binary addition. The pulses indicative of carries of one and zero are transmitted from stage to stage producing the proper sum outputs, and carry outputs for application to the next stage in the same manner as was described with reference to the embodiment of Fig. 5. The circuit of Fig. 9 may be also utilized to produce outputs indicative of the subtraction of the binary "Y" input from the binary "X" input. This type of operation is accomplished by applying the initial read-out or carry pulse to a terminal designated $\bar{B}_1$ for the lowest order position. This terminal may be termed the borrow zero terminal and is coupled to the input winding terminals 114A for each of the core circuits in the stage with which it is associated. A further input terminal designated $B_1$, which may be termed the borrow one terminal, is provided for each stage and this terminal receives a pulse from the preceding terminal when, in accordance with the rules of binary subtraction, a borrow of one from the next stage is required. The input terminals $B_1$ are coupled to the winding termnals 112A for each of the core circuits in the associated stage. The borrow outputs of one and zero are produced respectively at terminals designated $B_2$ and $\bar{B}_2$ associated with each stage from which they are transmitted to be applied to the next succeeding stage of the arithmetic circuit. The outputs for the binary subtraction of "X"–"Y" are produced at terminals designated D and $\bar{D}$ with a pulse being transmitted to terminal D for a difference output of one and a pulse being transmitted to terminal $\bar{D}$ for a difference output of zero. The proper outputs in accordance with the rules of binary subtraction for various combinations of inputs are illustrated in the tables below.

| Inputs | | | Outputs | |
|---|---|---|---|---|
| X | Y | Borrow | Difference | Borrow |
| 1 | 1 | 0 | 0 | 0 |
| 1 | 1 | 1 | 1 | 1 |
| 0 | 0 | 0 | 0 | 0 |
| 0 | 0 | 1 | 1 | 1 |
| 0 | 1 | 0 | 1 | 1 |
| 0 | 1 | 1 | 0 | 1 |
| 1 | 0 | 0 | 1 | 0 |
| 1 | 0 | 1 | 0 | 0 |

The mode of operation is similar to that for binary addition, the terminals 124A and 126A being utilized to produce the proper difference and borrow outputs when a binary one pulse is transmitted to the terminal $B_1$ from the preceding stage and the terminals 128A and 130A being utilized to produce the difference and borrow outputs when a borrow pulse of zero is transmitted from the preceding stage. These output winding terminals are connected to the proper ones of the difference terminals D and $\bar{D}$ and borrow terminals $B_2$ and $\bar{B}_2$ in accordance with the rules of binary subtraction illustrated in the table set forth above.

It should be noted that no change in circuitry is required, nor must any switches be set, to change the function of the circuit from that of addition to subtraction, it being only necessary to apply the read out pulse to the proper one of the terminals $\bar{C}_1$ or $\bar{B}_1$ for the lowest order stage of the multistage circuit and, further, since the flux reversals around each of the output openings are independent of each other, both carry and borrow pulses may be simultaneously propagated from stage to stage to simultaneously produce both sum and difference outputs.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A binary arithmetic circuit comprising four magnetic cores arranged in a coordinate array of columns and rows, each of said cores having first and second openings dividing the core into first and second parallel flux paths, each of said cores being normally in a first remanent condition with flux in said paths oriented in the same direction but capable of being switched to a second remanent condition with flux in said paths oriented in opposite directions, each of said cores having associated therewith first, second, third, and fourth input windings, said first and second input windings being effective only when coincidently energized to switch the associated core from said first to said second condition, each of said third input windings being threaded through said first opening and each of said fourth input windings being threaded through said second opening in the associated core, each of said third and fourth input windings being effective when energized to cause flux reversal around the particular opening through which it is positioned only when the associated core has been switched to said second condition; first, second, and third groups of binary input lines for said circuit, each group comprising first and second lines for respectively applying binary one and binary zero representing signals to said circuit, the input lines in said first group being each connected to the first input windings associated with the cores in a corresponding row of said array, the input lines in said second group being each connected to the second input windings associated with the cores in a corresponding column of said array, said first input line in said third group being connected to each of said third input windings and said second input line in said third group being connected to each of said fourth input windings, a plurality of output windings each threaded through a one of said first and second openings in one of said cores and each responsive to product outputs only when the flux is reversed around the particular opening through which it is threaded, and first and second order output lines for said circuit each connected to predetermined ones of said output windings.

2. A binary arithmetic circuit comprising a plurality of stages each including four magnetic cores arranged in a coordinate array of columns and rows, each of said cores having first and second openings dividing the core into first and second parallel flux paths, each of said cores being normally in a first remanent condition with flux in said paths oriented in the same direction but capable of being switched to a second remanent condition with flux in said paths oriented in opposite directions, each of said cores having associated therewith first, second, third, and fourth input windings, said first and second input windings being effective only when coincidently energized to switch the associated core from said first to said second condition, each of said third input windings being threaded through said first opening and each of said fourth input windings being threaded through said second opening in the associated core, each of said third and fourth input windings being effective when energized to cause flux reversal around the particular opening through which it is positioned only when the associated core has been switched to said second condition; first, second and third groups of binary input lines associated with each of said stages of core arrays, each group comprising first and second lines for respectively applying binary one and binary zero representing signals to the associated stage, the input lines in each said first group being each connected to the first input windings associated with the cores in a corresponding row of the associated array, the input lines in each said second group being each connected to the second input windings associated with the cores in a corresponding column of the associated array, said first input line in each said third group being connected to each of said third input windings in the associated core array and said second input line in each said third group being connected to each of said fourth input windings in the associated array, sum and carry output means for each stage each including a plurality of sum and carry output windings each threaded through a one of said first and second openings in one of said cores and each responsive to produce outputs only when the flux is reversed around the particular opening through which it is threaded, said first input line in said third group of lines associated with each stage being coupled to predetermined ones of the carry output windings for the preceding stage and said second input line in said third group of lines associated with each stage being connected to the remaining ones of said carry output windings in the preceding stage.

3. A binary arithmetic circuit comprising four magnetic cores arranged in a coordinate array of columns and rows; each of said cores having first, second, third and fourth openings dividing the core into first and second parallel flux paths; each of said cores being normally in a first remanent condition with flux in said paths oriented in the same direction but capable of being switched to a second remanent condition with flux in said paths oriented in opposite directions; each of said cores having associated therewith first, second, third, fourth, fifth, and sixth input windings; said first and second input windings being effective only when coincidently energized to switch the associated core from said first to second condition; said third, fourth, fifth, and sixth input windings being threaded respectively through said first, second, third and fourth openings in the cores with which they are associated; each of said third, fourth, fifth and sixth input windings being effective when energized to cause flux reversal around the particular opening through which it is positioned only when the associated core has been switched to said second remanent condition; first, second, third and fourth groups of binary input lines for said circuit each group comprising first and second lines for respectively applying binary one and binary zero representing signals to said circuit; the input lines in said first group being each connected to the first input windings associated with the cores in a corresponding row of said array; the input lines in said second group being each connected to the second input windings associated with the cores in a corresponding column of said array; said first input line in said third group being connected to each of said third input windings; said second input line in said third group being connected to each of said fourth input windings; said first input line in said fourth group being connected to each of said fifth input windings; said second input line in said fourth group being connected to each of said sixth input windings, a plurality of output windings each threaded through a one of said first, second, third and fourth openings in one of said cores and each responsive to produce outputs only when the flux is reversed around the particular opening through which it is threaded; and a plurality of output lines for said circuit each connected to predetermined ones of said output windings.

4. An arithmetic circuit comprising an array of magnetic cores arranged in columns and rows, there being N squared cores in said array where N is equal to the number of possible values in a single order of a particular arithmetic notation, first and second groups of input lines for simultaneously entering signals representative of the values in said notation of first and second factors, respectively, there being N lines in each of said first and second groups, first and second input windings associated with each of said cores, each of said cores being normally in a first remanent condition but capable of being switched to a second remanent condition only in response to coincident energization of the first and second input windings associated therewith, each of said input lines in said first group being connected to the first input windings associated with the cores in a corresponding row of said array, each of said input lines in said second group being connected to the second input windings associated with the cores in a corresponding column of said array, a third group of input lines for entering signals representative of values in said notation of a third factor after entry of said first and second factors, there being at least two lines in said third group each corresponding to a different value in said notation, a further group of input windings associated with each of said cores including an individual input winding associated with each core connected to each of said input lines in said third group, a plurality of groups of output windings associated with each of said cores, there being at least one output winding in each said group and one group of output windings associated with each of said individual input windings in said further group, each of said output windings in each group manifesting signal outputs only in response to a signal entered on the input line in said third group which is connected to the associated individual input winding when the associated core is in said second condition, first and second groups of output lines for manifesting signal outputs representative of first and second orders of the result of an arithmetic combination of said first, second and third factors, there being at least one output line in each of said groups, each of said output lines being connected to predetermined ones of said output windings associated with said cores and each output winding being connected to only one of said output lines.

5. The invention as claimed in claim 4 wherein N is equal to two and said particular notation is the binary notation.

6. The invention as claimed in claim 4 wherein N is equal to 10 and said particular notation is the decimal notation.

7. The invention as claimed in claim 6 wherein said first group of output lines includes four lines and the output signals manifested thereon are representative of the value of said first order of said result in the binary-decimal notation.

8. An arithmetic circuit comprising an array of magnetic cores arranged in columns and rows, the number of said cores in each row of said array and the number of cores in each column of said array being equal to the number of possible values in a single order of a particular arithmetic notation, a first group of input lines each inductively associated with all the cores in a corresponding row of said array for entering first signals representative of different values in said notation of a first arithmetic factor, a second group of input lines each inductively associated with all the cores in a corresponding column of said array for entering second signals representative of different values in said notation of a second arithmetic factor, each of said cores being normally in a first remanent state but capable of being caused to assume a second remanent state by coincident entry of said first and second signals on the lines in said first and second groups with which it is associated, a third group of input lines each inductively associated with each of said cores in said array for entering third signals representative of values in said notation of a third arithmetic factor after said first and second signals have been entered, there being at least two input lines in said third group, and at least first and second output lines each inductively associated with predetermined ones of said cores in said array for manifesting output signals representative of first and second order values in said notation of an arithmetic combination of said first, second, and third factors.

9. An arithmetic circuit comprising an array of logical switching elements arranged in columns and rows, there being N squared switching elements in said array where N is equal to the number of possible values in a single order of a particular arithmetic notation, a first group of input lines each associated with all the elements in a corresponding row of said array for entering signals representative of different values in said notation of a first arithmetic factor, a second group of input lines each associated with all the elements in a corresponding column of said array for entering signals representative of different values in said notation of a second arithmetic factor, a third group of input lines each associated with each of said elements in said array for entering signals representative of values in said notation of a third arithmetic factor, there being N input lines in each of said first and second groups and at least two input lines in said third group, and at least first and second output lines each associated with predetermined ones of said elements in said array for manifesting output signals representative of first and second order values in said notation of an arithmetic combination of said first, second, and third factors.

10. An arithmetic circuit comprising an array of logical switching elements arranged in columns and rows, there being N squared switching elements in said array where N is equal to the number of possible values in a single order of a particular arithmetic notation, a first group of input lines each associated with all the elements in a corresponding row of said array for entering signals representative of different values in said notation of a first arithmetic factor, a second group of input lines each associated with all the elements in a corresponding column of said array for entering signals representative of different values in said notation of a second arithmetic factor, a third group of input lines each associated with each of said elements in said array for entering signals representative of values in said notation of a third arithmetic factor, there being N input lines in each of said first, second, and third groups, and at least first and second output lines each associated with predetermined ones of said elements in said array for manifesting output signals representative of first and second order values in said notation of an arithmetic combination of said first, second, and third factors.

11. An arithmetic circuit comprising an array of logical switching elements arranged in columns and rows, there being N squared switching elements in said array where N is equal to the number of possible values in a single order of a particular arithmetic notation, a first group of input lines each associated with all the elements in a corresponding row of said array for entering signals representative of different values in said notation of a first arithmetic factor, a second group of input lines each associated with all the elements in a corresponding column of said array for entering signals representative of different values in said notation of a second arithmetic factor, a third group of input lines each associated with each of said elements in said array for entering signals representative of values in said notation of a third arithmetic factor, there being N input lines in each of said first and second groups and at least two input lines in said third group, and a group of output lines each associated with predetermined ones of said elements in said array for manifesting output signals representative of a first order value in an arithmetic notation other than said particular notation of an arithmetic combination of said first, second, and third factors.

12. The invention as claimed in claim 11 wherein N is equal to two, said particular arithmetic notation being the binary notation; and there are four output lines in said group of output lines, said other arithmetic notation being the binary decimal notation.

13. An arithmetic circuit comprising an array of logical switching elements arranged in columns and rows, there being N squared switching elements in said array where N is equal to the number of possible values in a single order of a particular notation, a first group of input lines each associated with all the elements in a corresponding row of said array for entering signals representative of different values in said notation of a first arithmetic factor, a second group of input lines each associated with all the elements in a corresponding column of said array for entering signals representative of different values in said notation of a second arithmetic factor, a third group of input lines each associated with each of said elements in said array for entering signals representative of values in said notation of a third arithmetic factor, a fourth group of input lines each associated with each of said elements in said array for entering signals representative of values in said notation of a fourth arithmetic factor, there being N input lines in each of said first and second groups and at least two input lines in each of said third and fourth groups, and a plurality of output lines each associated with predetermined ones of said elements in said array for manifesting output signals representative of first and second order values in said notation of arithmetic combinations of said first, second, and third factors and of said first, second, and fourth factors.

14. An arithmetic circuit comprising an array of magnetic cores arranged in columns and rows, the number of said cores in each row of said array and the number of cores in each column of said array being equal to the number of possible values in a single order of a particular notation, a first group of input lines each inductively associated with all the cores in a corresponding row of said array for entering first signals representative of different values in said notation of a first arithmetic factor, a second group of input lines each inductively associated with all the cores in a corresponding column of said array for entering second signals representative of different values in said notation of a second arithmetic factor, each of said cores comprising at least first and second portions each normally in a first remanent state but capable of being switched to a second remanent state by the entry of signals coincidently on the lines in said first and second groups with which it is associated, a third group of input lines for entering signals representative of values in said notation of a third arithmetic factor, said third group of input lines including a first input line inductively associated with said first portion of each of said cores and a second input line inductively associated with said second portion of each of said cores, each of said portions when in said second remanent state being capable of being switched to a third remanent state by the entry of a signal on the particular one of said first and second input lines with which it is associated, and means for manifesting output signals representative of first and second order values in said notation of an arithmetic combination of said first, second and third factors, said output means including a plurality of output lines each associated with particular ones of sa'd portions of said cores and each effective to produce an output only when one of the portions with which it is inductively associated is switched from said second to said third remanent state.

15. The invention as claimed in claim 14 wherein each of portions of said cores has an opening positioned therethrough dividing the portion into first and second flux paths, and each said portion is provided with an input winding embracing one of said flux paths and at least one output winding embracing one of said flux paths, each of said input windings being connected to one of said first and second input lines in said third group and each of said output windings being connected to one of said plurality of output lines.

16. A circuit for performing arithmetic operations on two multi-ordered arithmetic factors entered in the form of signals representative of the values of said factors in a particular notation, said circuit comprising a plurality of arithmetic stages, each stage corresponding to a particular order of said notation and each comprising an array of multipath switching elements arranged in columns and rows, the number of said switching elements in each row and in each column of each array being equal to the number of possible values in an order of said notation, first and second groups of input lines for entering said signals representative of said first and second factors, respectively, there being associated with each of said stages a number of input lines in said first group and a number of lines in said second group corresponding to the number of possible values in a single order of said notation, each of the input lines in each of said first groups being associated with the switching elements in a corresponding column of the corresponding array and each of the input lines in each of said second groups being associated with the elements in a corresponding row of the corresponding array, each of said elements being normally in a first condition but settable to a second condition in response to coincident entry of signals on the particular lines in said first and second groups with which it is associated, means for simultaneously applying value signals to lines in said first and second groups to thereby cause one and only one of said elements in each of said stages to be set to said second condition, first and second order output lines associated with the elements in each stage for manifesting output signals respectively representative of first and second order value outputs for the stage, there being at least first and second ones of said second order output lines, a third group of at least two input lines associated with the elements in each stage each coupled to a corresponding one of said second order output lines in the preceding stage for applying to these elements in response to output signals manifested on said second order output lines signals representative of first and second values in said notation, each of said signals applied by input lines in said third group being effective in response to a value signal entered thereon to cause value signals to be manifested on the first and second order output lines associated with the element in the associated stage which has been set to said second condition in response to the value signals applied to said lines in said first and second groups.

17. A circuit for performing arithmetic operations on two multi-ordered arithmetic factors entered in the form of signals representative of the value of said factors in a particular notation, said circuit comprising a plurality of arithmetic stages, each stage corresponding to a particular order of said notation and comprising an array of magnetic cores arranged in columns and rows, the number of said cores in each row and in each column of each array being equal to the number of possible values in an order of said notation, first and second groups of input lines for entering said signals representative of said first and second factors, respectively, there being associated with each of said stages a number of input lines in said first group and a number of lines in said second group corresponding to the number of possible values in a single order of said notation, each of the input lines in each of said first groups being inductively associated with the cores in a corresponding column of the corresponding array and each of the input lines in each of said second groups being inductively associated with the cores in a corresponding row of the corresponding array, each of said elements being normally in a first remanent condition but capable of being switched to a second remanent condition in response to coincident entry of signals on the particular lines in said first and second groups with which it is inductively associated, means for simultaneously applying value signals to lines in said first and second groups to thereby cause one and only one of said cores in each of said stages to be switched to said second condition, first and second order output lines inductively associated with cores in each stage for manifesting output signals respectively representative of first and second order value outputs for the stage; there being at least first and second ones of said second order output lines; a third group of at least two input lines inductively associated with the cores in each stage each coupled to a corresponding one of said second order output lines for the preceding stage for applying to these cores, in response to output signals manifested on said second order output lines, signals representative of first and second values in said notation; each of said signals applied by said input lines in said third group being effective to cause value signals to be manifested on the first and second order output lines associated with the core in the associated stage which has been set to said second condition in response to the value signals applied to said lines in said first and second groups.

18. A circuit for performing arithmetic operations on two multi-ordered arithmetic factors entered in the form of signals representative of the value of said factors in a particular notation, said circuit comprising an array of magnetic cores arranged in columns and rows, the number of said cores in each row and in each column being equal to the number of possible values in an order of said notation, first and second groups of input lines for entering said signals representative of said first and second factors, respectively, there being in each said group a number of input lines corresponding to the number of possible values in a single order of said notation, each of the input lines in said first group being inductively associated with the cores in a corresponding column of the array and each of the input lines in said second group being inductively associated with the cores in a corresponding row of the array, each of said cores including first and second portions, said portions being normally in a first remanent condition but capable of being switched to a second remanent condition in response to coincident entry of signals on the particular lines in said first and second groups with which it is associated, means for simultaneously applying value signals to one input line in each of said first and second groups to thereby cause said first and second portions of one and only one of said cores to be switched to said second remanent condition, first and second order output lines inductively associated with said first and second portions of said cores for manifesting output signals respectively representative of first and second order value outputs, there being at least first and second ones of said second order output lines, a third group of input lines including first and second input lines respectively inductively associated with said first and second portions of each of said cores for entering signals respectively representative of arithmetic values of zero and one, means coupled to said first and second input lines in said third group for applying signals thereto, each of said first and second input lines in said third group being effective when a signal is applied thereto to cause signals to be developed on the first and second order output lines inductively associated with the core which has been set to said second remanent condition in response to the value signals applied to said lines in said first and second groups, said output signals being manifested only on those output lines which are inductively associated with the one of said portions of said core with which the one of said input lines in said third group to which a signal is applied is associated.

References Cited in the file of this patent

Rajchman et al.: The Transflexor, Proceeding of the I.R.E. (March 1956), pages 321 to 330.

Abbott et al.: Multihole Ferrite Core Configurations and Applications, Proceedings of the I.R.E. (August 1957), pages 1081 to 1093.

UNITED STATES PATENT OFFICE
CERTIFICATION OF CORRECTION

Patent No. 2,962,215 November 29, 1960

Munro K. Haynes

It is hereby certified that error appears in the above numbered patent requiring correction and that the said Letters Patent should read as corrected below.

Column 8, line 18, for "$(x\ \bar{y})$" read -- $(\bar{x}\ y)$ --; line 69, after "flux" insert -- in --; column 11, line 8, after "A0" insert -- through A9 --; column 14, line 18, for "are" read -- as --; line 44, for "output" read -- input --; column 17, line 12, for "product" read -- produce --.

Signed and sealed this 11th day of July 1961.

(SEAL)
Attest:

ERNEST W. SWIDER
Attesting Officer

DAVID L. LADD
Commissioner of Patents